2,937,196
LACTONITRILE

John A. Kordak, Darien, Robert J. Munch, Greenwich, and Lorence Rapoport, Stamford, Conn., assignors to American Cyanamid Company, New York, N.Y., a corporation of Maine No Drawing. Application June 6, 1957
Serial No. 663,908

8 Claims. (Cl. 260—465.6)

This invention relates to the recovery of lactonitrile. More particularly, it relates to the treatment of a crude lactonitrile solution to obtain a high purity lactonitrile product in good yield.

Lactonitrile is useful as an organic intermediate in the preparation of such compounds as lactic acid, ethyl lactate and the like, and is potentially useful in various other fields. A potential source of lactonitrile is from the manufacture of acrylonitrile from HCN and acetylene in which it is produced as a by-product in a ratio by weight of about 1:10 to acrylonitrile.

In the purification of crude acrylonitrile, it is a usual practice to recover the acrylonitrile content of the HCN-acetylene reaction gas by first absorbing it in water. This dilute aqueous solution is then steam stripped to obtain a more concentrated solution of acrylonitrile from which purified acrylonitrile is obtained by a series of refining steps in which acrylonitrile is separated from impurities of lower and high boiling points.

The residual liquor remaining after recovery of acrylonitrile comprises primarily lactonitrile along with small amounts of acrylonitrile, cyanobutadiene, divinylacetylene and other impurities. Various methods have been suggested for recovering this lactonitrile content. These, however, have been unsatisfactory for any of various reasons. Primarily, it has been difficult to obtain a product of adequate purity and free from color and odor. Good yields have also been difficult to attain, while in some instances the proposed procedure has been of such a complex nature as to be unsatisfactory. There has continued to remain, therefore, a need for a method for treating such crude lactonitrile solutions to recover the lactonitrile content therefrom.

It is a primary object of this invention to fulfill this need. It is a further object to provide a recovery procedure free from the objections of prior proposals. It is a still further object of this invention to provide a recovery procedure which is simplified and capable of being operated with a minimum of supervision.

In describing the field of this invention, reference has been made to a crude lactonitrile solution obtained as a by-product in the manufacture of acrylonitrile from HCN and acetylene. The more detailed description of the invention which follows also will be discussed with respect to such an impure lactonitrile solution. However, it should be noted that the process of this invention may be practiced on any lactonitrile solution containing similar impurities regardless of the source thereof.

The presence of chlorine containing compounds in crude lactonitrile, produced as a by-product in the manufacture of acrylonitrile by racting HCN and acetylene, is known. The concentration thereof may vary but is generally from about 0.5–1.0%. This chlorine content is present in the form of various compounds such as $C_5H_6NCl$, $C_7H_4NCl$ and the like which have boiling points close to that of lactonitrile. Accordingly, they are extremely difficult to separate by distillation under conditions suitable for high recoveries of lactonitrile.

In accordance with this invention, the above described objects have been met by a process which successfully reduces the chlorine content without adversely affecting the recovery of lactonitrile. In general, the process of this invention comprises first washing a crude lactonitrile solution with a solvent. After separating the solvent layer, the residual lactonitrile solution is further treated to separated additional impurities to give an excellent yield of high purity lactonitrile.

A wide selection of solvents may be employed, it being only necessary that it be capable of solubilizing the chlorinated compounds. It is preferable, however, for optimum recovery of lactonitrile that the solvent be substantially insoluble in lactonitrile. Additionally, its boiling point should be sufficiently different from that of lactonitrile to facilitate removal of any solvent which might remain with the lactonitrile. Among those solvents which have been found to be particularly effective are various halogenated aliphatic compounds such as carbon tetrachloride, chloroform, methylene chloride, ethylenedichloride, trichloroethylene, trichlorofluoromethane (B.P. 24° C.), ethylenechlorobromide (B.P. 107–108° C.), 1,1,1-trichloro-2,2,2-trifluoroethane (B.P. 26° C.), and the like. Also various aromatic compounds have been quite effective. Among these may be mentioned, particularly, those of the benzene series such as benzene, toluene, o-, m- or p-xylene and the like. Mixtures of solvents likewise may be employed to take advantage of the desirable characteristics of different solvents.

Washing of the lactonitrile may be conducted in any conventional manner, the particular mode employed forming no part of this invention. Thus, it may be conducted batchwise or in a continuous fashion. When operating batchwise, the solution of lactonitrile is washed several times with solvent in conventional separatory apparatus. Similarly, when operating continuously, the lactonitrile and solvent may be fed to opposite ends of a conventional extraction column.

The amount of solvent employed is obviously that required to obtain optimum extraction. It may vary considerably depending to some extent on whether batch or continuous extraction is employed. In batch extraction, a ratio of solvent to lactonitrile solution of 1:2 has been found effective. Usually, however, a higher ratio will be employed ranging as high as 4 or 5:1 and even higher. In continuous extraction, good results are obtained using considerably smaller ratios. For instance, a ratio of solvent to lactonitrile solution of as low as 1:7 is effective although a somewhat higher range of 1:3–5 is preferred. An advantage of continuous extraction over batch extraction appears to be in the use of smaller amounts of solvent to obtain good extractions.

It has been found in accordance with this invention that it is particularly advantageous to dilute the crude lactonitrile solution before extraction. By so doing, the solubility of the solvent in the lactonitrile may be further decreased. Dilution, moreover, appears to influence the solvent extraction by enhancing the removal of chlorinated compounds. While any diluent may be employed provided it does not interfere with the extraction and subsequent purification, the obvious diluent is water. The amount of dilution water employed may vary considerably. As little as 5% by weight is influential. This may be increased to 50% and even higher. No added advantage is gained, however, by using more than about 50%. The added water, moreover, must be subsequently removed from the lactonitrile and the use of excessive amounts of water creates a separation problem. A preferred range of dilution water is from about 25%–50% by weight of the crude lactonitrile solution.

When using dilution water, an additional modification of solvent extraction may be employed. Solvent and water may be fed to opposite ends of a continuous extraction column while crude lactonitrile is introduced at a point intermediate. A mixture of solvent and impurities leaves one end of the column while an aqueous solution of lactonitrile leaves the opposite end.

After solvent extraction by whatever mode practiced, the lactonitrile solution is further treated to remove other impurities. This is preferably accomplished by distillation in which the low boiling compounds are separated from lactonitrile and the high boiling compounds, and then lactonitrile is separated from the high boilers. Distillation may be conducted batchwise or continuously with temperatures and pressures appropriately controlled to take off water, acrylonitrile and other low boilers as a first cut and lactonitrile as a second cut.

The following examples further illustrate the invention. All parts are by weight unless otherwise noted.

EXAMPLE I

A crude lactonitrile solution having the following analysis is divided into 3 equal samples:

Component: Percent by weight
Total CN as lactonitrile _____ 84.9
Chloride _____ 0.5
Acrylonitrile _____ 4.8
Water _____ 1.08

One sample is then diluted with water in a 1:1 weight ratio and then washed along with a second sample four times, each time with an amount of $CCl_4$ equivalent to the weight of the sample. The raffinates, and the third sample as a blank are then distilled. The first cuts containing water, acrylonitrile and other low boilers are collected at 25°–35° C. at 15–20 mm. absolute pressure, and the lactonitrile cuts at 50°–60° C. at 2–10 mm. Results appear in Table I.

Table I

| Component | Mass Spectrometer Results (Mol Percent) | | |
|---|---|---|---|
| | Blank | 0% H₂O | 50% H₂O |
| Acrylonitrile | 0.9 | 0.6 | 0.1 |
| Divinylacetylene | 0.2 | 0.1 | 0.03 |
| Cyanobutadiene | 0.3 | 0.2 | 0.03 |
| Chloroprene | 0.4 | 0.2 | 0.04 |
| $C_5H_6NCl$ | 0.4 | 0.3 | 0.04 |
| $C_7H_4NCl$ | 0.05 | 0.01 | 0.01 |
| Yield of Lactonitrile (Percent) | 89 | 81 | 83 |

EXAMPLE II

To illustrate the use of varying amounts of dilution water, two equal samples of crude lactonitrile according to Example I are diluted in the ratios of 1:1 and 9:1 with water. Each sample is then washed four times each time with an equivalent amount by weight of trichloroethylene. The raffinates are then distilled as in Example I. Results appear in Table II.

Table II

| Component | Mass Spectrometer Results (Mol Percent) | |
|---|---|---|
| | 10% H₂O | 50% H₂O |
| Acrylonitrile | 0.1–0.3 | 0.1 |
| Proprionitrile | 0.1–0.2 | <0.01 |
| Acetic Acid | 0.1 | <0.05 |
| Methylvinylacetone | <0.02 | <0.02 |
| Divinylacetylene | 0.03 | 0.01 |
| Cyanobutadiene | 0.1 | 0.02 |
| Chloroprene | 0.04 | 0.01 |
| $C_5H_6NCl$ | 0.03 | 0.01 |
| $C_7H_4NCl$ | <0.01 | <0.01 |
| Yield of Lactonitrile (Percent) | 80 | 89.5 |

EXAMPLE III

To illustrate continuous extraction as compared to batch extracted, one sample of crude lactonitrile according to Example I diluted 1:1 with water is batch extracted using any equivalent amount of $CCl_4$ four separate times (lactonitrile:$CCl_4$=.25/1). An equivalent amount of a second sample similarly diluted with water is washed with $CCl_4$ in a countercurrent extraction column using a lactonitrile:$CCl_4$ ratio of 5:1. The raffinates are then distilled as in Example I. Results appear in Table III.

Table III

| Component | Mass Spectrometer Results (Mol Percent) | |
|---|---|---|
| | Batch | Continuous |
| Acrylonitrileg | 0.1 | 0.3 |
| Proprionitrile | <0.01 | 0.2 |
| Acetic Acid | <0.05 | 0.4 |
| Methylvinylketone | <0.02 | 0.1 |
| Divinylacetylene | 0.01 | 0.02 |
| Cyanobutadiene | 0.02 | 0.1 |
| Chloroprene | 0.01 | 0.4 |
| $C_5H_6NCl$ | 0.01 | 0.03 |
| $C_7H_6NCl$ | <0.01 | <0.01 |
| Yield of Lactonitrile (Percent) | 82.4 | 85 |

EXAMPLE IV

To illustrate the use of other solvents, a crude lactonitrile of the following analysis is divided into 5 equal samples.

Component Percent
Total CN as lactonitrile _____ 84.9
Chloride _____ 0.5
Acrylonitrile _____ 4.8
Water _____ 1.08

Each sample except a blank is then diluted with water in a 1:1 ratio. The diluted solutions are then extracted with solvents according to Table IV using a ratio of solvent to diluted lactonitrile solution of 1:2 and agitating for 2 minutes. After separating the phases, the lactonitrile phases and the blank are subjected to distillation to separate water, acrylonitrile and other low boilers. Without separating the lactonitrile from the high boilers, the residues are subjected to mass spectrometry to determine the effectiveness of the extraction step. Obviously, to obtain a purified product, the residue would be distilled to take a lactonitrile cut as in Example I. Results appear in Table IV.

Table IV

| Component | Mass Spectrometer Results (Mol Percent) | | | | |
|---|---|---|---|---|---|
| | Blank | CCl₄ | Toluene | Dichloroethylene | Trichloroethylene |
| α-Chloroacrylonitrile | 0.18 | | | | |
| $C_5H_6NCl$ | 0.3 | 0.07 | 0.04 | 0.04 | 0.05 |
| $C_7H_6NCl$ | <0.01 | <0.01 | | <0.01 | |
| Cyanobutadiene | 1.1 | 0.32 | 0.28 | 0.23 | 0.30 |
| Divinyl acetylene | 0.1 | 0.05 | 0.03 | 0.03 | 0.04 |
| Methylvinyl ketone | 0.1 | 0.09 | 0.08 | 0.08 | 0.09 |
| Allyl cyanide | 0.3 | 0.03 | 0.08 | 0.02 | 0.02 |
| Acetic Acid | 0.4 | 0.2 | 0.19 | 0.2 | 0.23 |
| Propionitrile | 0.8 | 0.32 | 0.39 | 0.39 | 0.39 |
| Acrylonitrile | 3.0 | 0.43 | 0.35 | 0.28 | 0.38 |
| Chloroprene | 0.24 | 0.09 | 0.04 | 0.04 | 0.06 |

EXAMPLE V

Results similar to those of the preceding examples are obtained when using a mixture of solvents, such as a mixture of $CCl_4$ and dichloroethylene.

We claim:
1. A method of recovering a substantially odor and color free lactonitrile of high purity and in good yield from a crude lactonitrile solution containing impurities including chlorinated compounds which comprises: diluting said solution with at least about 5% by weight of water, washing said solution of lactonitrile with at least one solvent selected from the group consisting of carbon tetrachloride, chloroform, methylene chloride, ethylenedichloride, trichloroethylene, trichlorofluoromethane, ethylenechlorobromide, 1,1,1,-trichloro-2,2,2,-trifluoroethane, benzene, toluene, o-xylene, m-xylene and p-xylene whereby said chlorinated compounds are extracted, separating the solvent extract, and subjecting said solution of lactonitrile to distillation to recover a purified lactonitrile product.

2. A method according to claim 1 in which the amount of water is 10–50% by weight.

3. A method according to claim 1 in which the solvent is carbon tetrachloride.

4. A method according to claim 1 in which the solvent is dichloroethylene.

5. A method according to claim 1 in which the solvent is trichloroethylene.

6. A method according to claim 1 in which the solvent is toluene.

7. A method according to claim 1 in which the solvent is a mixture of carbon tetrachloride and dichloroethylene.

8. A continuous method of recovering lactonitrile of high purity and in good yield from a crude lactonitrile solution containing impurities including chlorinated compounds which comprises: feeding water and at least one solvent selected from the group consisting of carbon tetrachloride, chloroform, methylene chloride, ethylenedichloride, trichloroethylene, trichlorofluoromethane, ethylenechlorobromide, 1,1,1,-trichloro-2,2,2,-trifluoroethane, benzene, toluene, o-xylene, m-xylene and p-xylene to opposite ends of an extraction column, feeding crude lactonitrile to said column at a point intermediate said ends, withdrawing an aqueous lactonitrile solution from one end of said column and a solution of chlorinated compounds in said solvent from the other end and subjecting said aqueous lactonitrile solution to distillation.

References Cited in the file of this patent

UNITED STATES PATENTS

| | | |
|---|---|---|
| 2,526,676 | Lovett | Oct. 24, 1950 |
| 2,649,472 | Lovett | Aug. 18, 1953 |
| 2,688,034 | Stehman | Aug. 31, 1954 |
| 2,702,300 | Keller et al. | Feb. 15, 1955 |
| 2,719,169 | De Croes et al. | Sept. 27, 1955 |
| 2,731,490 | Barsky | Jan. 17, 1956 |
| 2,733,259 | De Croes et al. | Jan. 31, 1956 |
| 2,793,227 | Sadle | May 21, 1957 |
| 2,820,812 | Lichtenberger et al. | Jan. 21, 1958 |